US008880831B2

(12) United States Patent
Krishnan et al.

(10) Patent No.: US 8,880,831 B2
(45) Date of Patent: Nov. 4, 2014

(54) METHOD AND APPARATUS TO REDUCE MEMORY READ LATENCY

(75) Inventors: Guhan Krishnan, Chelmsford, MA (US); Jonathan M. Owen, Northborough, MA (US); Brian Amick, Bedford, MA (US); Hanwoo Cho, Acton, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 309 days.

(21) Appl. No.: 13/106,285

(22) Filed: May 12, 2011

(65) Prior Publication Data

US 2012/0290800 A1    Nov. 15, 2012

(51) Int. Cl.
*G06F 13/16*    (2006.01)

(52) U.S. Cl.
CPC ........ *G06F 13/1663* (2013.01); *G06F 13/1689* (2013.01)
USPC ........................................................ 711/167

(58) Field of Classification Search
CPC . G06F 13/1689; G06F 13/4243; G06F 13/16; G11C 7/22; G11C 7/1072; G11C 7/1066
USPC ........................................................ 711/167
See application file for complete search history.

(56) References Cited

U.S. PATENT DOCUMENTS

| | | | | |
|---|---|---|---|---|
| 6,438,670 | B1 * | 8/2002 | McClannahan | 711/167 |
| 6,604,179 | B2 * | 8/2003 | Volk et al. | 711/167 |
| 6,915,399 | B1 * | 7/2005 | McDonnell et al. | 711/167 |
| 6,941,433 | B1 * | 9/2005 | Libby et al. | 711/167 |
| 7,590,789 | B2 * | 9/2009 | Rashid | 710/310 |
| 7,644,237 | B1 * | 1/2010 | Petersen et al. | 711/146 |
| 7,716,443 | B2 * | 5/2010 | Seo et al. | 711/167 |
| 7,779,292 | B2 * | 8/2010 | Fields et al. | 714/5.11 |
| 2007/0005922 | A1 * | 1/2007 | Swaminathan et al. | 711/167 |
| 2009/0013143 | A1 * | 1/2009 | Jeddeloh et al. | 711/167 |
| 2009/0327596 | A1 * | 12/2009 | Christenson et al. | 711/105 |

\* cited by examiner

*Primary Examiner* — Charles Rones
*Assistant Examiner* — Andrew Russell
(74) *Attorney, Agent, or Firm* — Meyertons, Hood, Kivlin, Kowert & Goetzel, P.C.; Erik A. Heter

(57) ABSTRACT

A method and apparatus for training read latency of a memory are disclosed. A memory controller includes a command FIFO configured to convey commands to a memory, a data queue coupled to receive data from the memory, and a register configured to provide a value indicative of a number of cycles of a first clock signal after which data is valid. During a startup routine, the memory controller is configured to compare data received by the data queue to a known data pattern after a specified number of cycles of the first clock signal have elapsed. The memory controller is further to configured to decrement the first value and repeat conveying and comparing if the data received matches the data pattern. If the received data does not match the data pattern for any attempted read of the memory, the memory controller is configured to program a second value into the register.

21 Claims, 9 Drawing Sheets

METHOD AND APPARATUS TO REDUCE MEMORY READ LATENCY

BACKGROUND

1. Field of the Invention

This invention relates to computer systems, and more particularly, to accessing memory in computer systems.

2. Description of the Related Art

As integrated circuit (IC) technology has advanced, a greater number of functions may be integrated onto a single chip. In the field of processors, higher levels of integration have led to the design and fabrication of system-on-a-chip (SOC) type devices. In various implementations, an SOC may include one or more processor cores, a graphics processing unit, various input/output (I/O) ports, and a memory controller. When such an SOC is implemented in a computer system, communication with a system random access memory (RAM) by other components (e.g., processor cores) may be coordinated through the memory controller.

The various components on an SOC, including the memory controller, may operate according to a clock signal that is different than that used to synchronize transfers of data to and from system RAM (e.g., in different clock domains). Furthermore, the frequency of the respective clock signals may be varied during system operation. For example, the frequency of a memory controller clock signal may be reduced to conserve power. Thus, it is possible that the respective clock signals used on the SOC (including that used by the memory controller) and the system RAM may be mismatched in frequency. This may affect the possible rates of data transfer between the SOC (and components thereof) and the system RAM, and in turn, may thus affect the performance of the computer system in which the SOC and system RAM are implemented.

Because clock signals in different domains may be mismatched in frequency, various hardware schemes may be implemented to perform bandwidth matching of information crossing from one clock domain to another. This may reduce the performance penalty that might otherwise be incurred when respective clock signals in different domains are mismatched in frequency.

SUMMARY OF EMBODIMENTS OF THE DISCLOSURE

A method and apparatus for training read latency of a memory is disclosed. In one embodiment, a memory controller includes a command FIFO (first-in first-out memory) configured to convey commands to a memory. The memory controller also includes a data queue coupled to receive data from the memory, and a register configured to provide a value indicative of a number of cycles of a first clock signal after which data is valid subsequent to the command FIFO conveying a read command to the memory. During a startup routine, the memory controller is configured to convey a read command to the memory and to compare data received by the data queue to a known data pattern after a specified number of cycles of the first clock signal have elapsed, the specified number indicated by a first value stored in the register. The memory controller is further configured to decrement the first value and repeat conveying and comparing if the data received matches the data pattern. The memory controller is configured to program a second value into the register, the second value being a memory read latency value expressed as a number of cycles of the first clock signal, which is a lowest number of cycles of the first clock signal at which the data received matches the data pattern.

In one embodiment, a method includes a memory controller writing a data pattern a block of memory furthest from the memory controller relative to other blocks of memory. Subsequent to writing the data pattern, a read command is provided to the memory. Data is then received from the memory responsive to the read command. The received data is compared to the data pattern after a specified number of cycles of a first clock signal have elapsed subsequent to providing the read command. If the data matches the data pattern, the specified number of clock cycles is decremented, and the issuing of the read command, the receiving of data, and the comparing of data to the known pattern is repeated. If the data does not match the data pattern, a memory read latency value may be written to a register, wherein the memory read latency value is based on a lowest specified number of cycles of the first clock signal at which the data matched the data pattern.

BRIEF DESCRIPTION OF THE DRAWINGS

Other aspects of the invention will become apparent upon reading the following detailed description and upon reference to the accompanying drawings in which.

Figure 1:
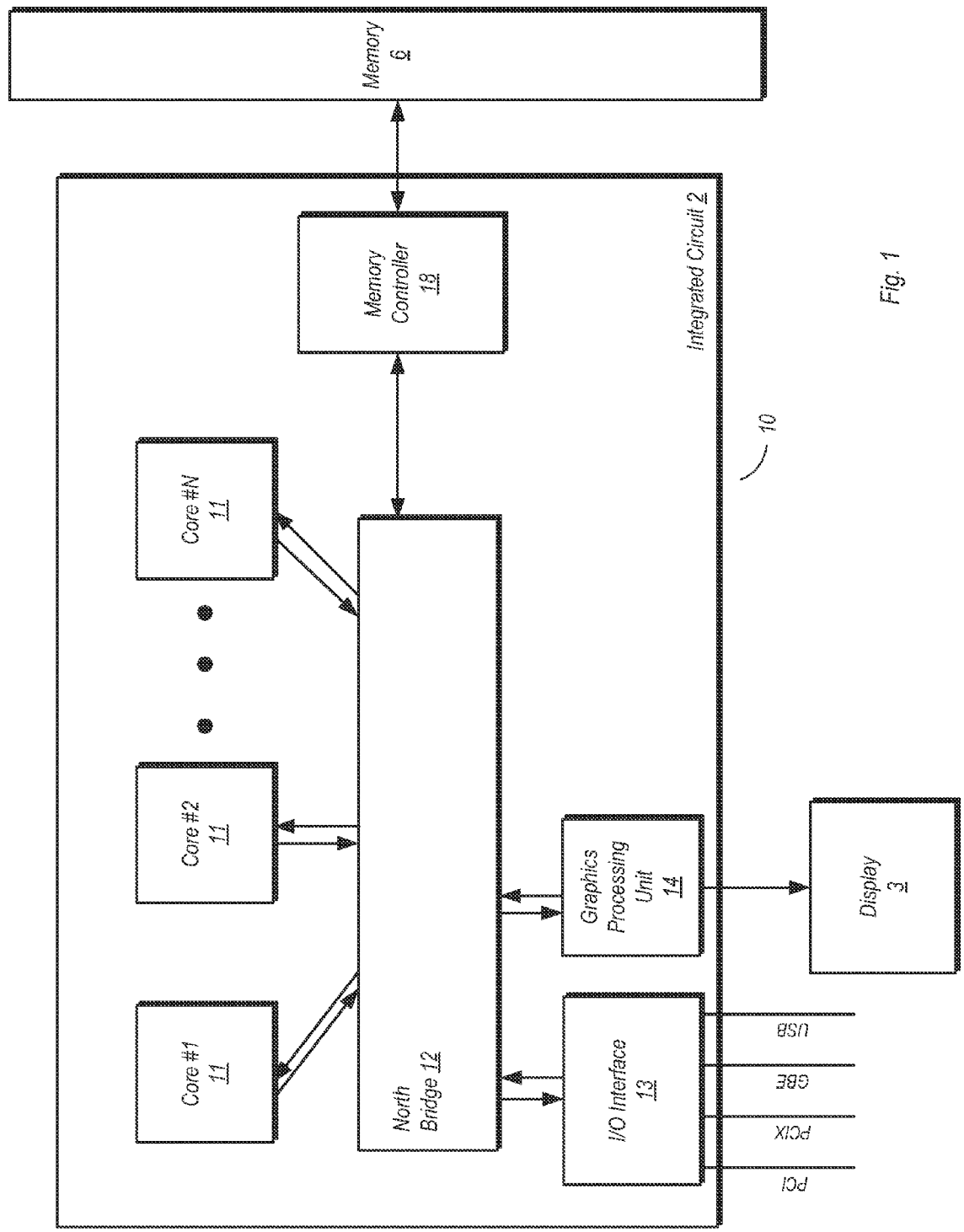
FIG. 1 is a block diagram of one embodiment of a system on a chip (SOC)

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

Overview:

The present disclosure is directed to various embodiments of a method and apparatus to reduce latency of memory reads. The method may be applied to systems where a memory controller may operate at a clock frequency that is different from the clock frequency at which the memory operates. The performance of some computer system workloads may be highly dependent on the memory read latency, and thus it is important to reduce this time. One method for doing so may include measuring a minimum safe latency time through an experimental training procedure. The actual safe time may vary due to sources of uncertainty in the read path. Such sources of uncertainty may include circuit trace delays, clock jitter, variable synchronization delays, voltage variations, temperature variations, phase errors, and so on. Lane skew, in which different bits of data of a requested block of memory arrive at different times, may also be a source of uncertainty. Thus, the latency time determined through the experimental training procedure is typically augmented with a certain amount of time based on the uncertainty that may exist in the read path. This augmentation adds latency to the memory read time. In prior art systems, it is possible that the training procedure measured the read latency at a high end of a passing range, and thus, the addition of extra time for uncertainty may effectively result in at least some of the uncertainty time being double-counted. The methodology and apparatus described herein are configured to eliminate much of this uncertainty, and thus reduce the memory read latency.

The method and apparatus described herein may include a memory controller configured to issue memory commands in a corresponding clock domain for reads of a memory in a different clock domain. Data may be received in a queue in a first clock domain at some time subsequent to issuance of a read command, and read therefrom at a specified time in a second clock domain subsequent to the memory controller issuing a read command. The method and apparatus may be directed to determining a minimum safe read time to reduce the read latency. The method and apparatus may thus implement a training procedure that includes performing writes and reads to a known slowest memory location. The reads of this location may be performed at various times subsequent to issuance of corresponding read commands in order to determine a minimum amount of time in which valid data may be read from the queue. The sources of uncertainty may be added to the minimum time to arrive at an operational read time. The methodology may thus be further directed to reducing the amount of uncertainty during the training procedure in order to prevent any uncertainty from being counted more than once.

The reduction of uncertainty may be accomplished using various methods. One method includes training the latency through an iterative process in which data is read from a specified block of memory (e.g., the slowest block as noted above) and compared to a known data pattern that was previously written to that location. A large number of iterations may be performed in order to increase confidence that the minimum read latency has been determined. The method may begin with a maximum read time, with the read time being decreased for at least some subsequent iterations. At earlier iterations (and thus longer read times), valid data may be read from the queue. At some point, read times may be reduced to a value in which valid data is read from the queue for only some iterations, but not all. Read time may be further reduced to a value in which valid data is never read from the queue. The method may then add compensation factors (that are based on the uncertainties discussed above) to the minimum read time value in which valid data was received for at least some (but not necessarily all) iterations in order to arrive at an operational latency. A memory controller and various units thereof may implement the method in one embodiment. The method may be performed in a system wherein respective clock speeds of the memory controller and the memory are at least sometimes different (e.g., when the memory controller operates at a slower clock speed than the memory).

Another method to aid in the reduction of uncertainty may include adjusting a phase alignment between a clock signal received by the memory and a clock signal received by the memory controller. The frequency of the clock signal received by the memory may be different from the frequency of the clock signal received by the memory controller. By adjusting the phase alignment to a desired value (e.g., rising edges of the two clock signals are nominally aligned), a range of uncertainties may be shifted and thus reduced. The setup time may be defined as the time at which the information containing the command, as input to the memory must be stable prior to a clock edge to guarantee the received command is correct. This time requirement may vary between different circuit boards upon which the memory and the IC containing the memory controller may be implemented.

The methodology disclosed herein may also include throttling a clock signal received by the command FIFO (first-in, first-out memory) when the rates of reads from and writes thereto are not bandwidth matched. In one embodiment, two commands may be written to the command FIFO per cycle of a first clock signal. In the same embodiment, one command may be read from the command FIFO per cycle of a second clock signal. For instances when the writes and reads are not bandwidth matched, writes to the command FIFO may sometimes occur at a higher rate than reads from the same. Accordingly, without throttling the first clock signal, a write pointer would pass a read pointer and begin overwriting some commands before they have a chance to be read. Thus, a memory controller or other apparatus (or software in some cases) may implement a method wherein a bandwidth ratio based on read and write bandwidth is determined. Based on this ratio, the first clock signal may periodically be inhibited from being provided to the command FIFO, thus causing writes to be skipped. This may prevent the write pointer from overtaking the read pointer.

The latency for a command to pass through the command FIFO may depend upon whether or not it was written into a first or second command slot on a given cycle of the first clock signal (since the second command will be read out in the second clock domain after the first command). This may be a source of uncertainty in the read latency path. Accordingly, the methodology described herein may include providing a control to determine which slot a command it to be written into during training to eliminate this source of uncertainty from the training process.

These methods and various apparatus embodiments used to implement them as noted above will now be discussed in further detail below.

Computer System Including System on a Chip:

FIG. 1 is a block diagram of one embodiment of a computer system 10. In the embodiment shown, computer system 10 includes integrated circuit (IC) 2 coupled to a memory 6. In the embodiment shown, IC 2 is a system on a chip (SOC) having a number of processor cores 11. In various embodiments, the number of processor cores may be as few as one, or may be as many as feasible for implementation on an IC die. In multi-core embodiments, processor cores 11 may be identical to each other (i.e. homogenous multi-core), or one or more cores may be different from others (i.e. heterogeneous multi-core). Processor cores 11 may each include one or more execution units, cache memories, schedulers, branch prediction circuits, and so forth. Furthermore, each of processor cores 11 may be configured to assert requests for access to memory 6, which may function as the main memory for computer system 10. Such requests may include read requests and/or write requests, and may be initially received from a respective processor core 11 by north bridge 12. Requests for access to memory 6 may be initiated responsive to the execution of certain instructions, and may also be initiated responsive to prefetch operations.

North bridge 12 in the embodiment shown may provide routing and control of communications between the various functional units of IC 2. Accordingly, north bridge 12 may include one or more crossbar units configured to couple different functional units to one another (e.g., coupling one of the processor cores 11 to memory controller 18 during a memory access request). Furthermore, north bridge 12 may implement various power management functions used to optimize power consumption vs. performance during the operation of IC 2.

I/O interface 13 is also coupled to north bridge 12 in the embodiment shown. I/O interface 13 may function as a south bridge device in computer system 10. A number of different types of peripheral buses may be coupled to I/O interface 13. In this particular example, the bus types include a Peripheral Component Interconnect (PCI) bus, a PCI-Extended (PCI-X), a gigabit Ethernet (GBE) bus, and a Universal Serial Bus (USB). However, these bus types are exemplary, and many other bus types may also be coupled to I/O interface 13. Peripheral devices may be coupled to some or all of the peripheral buses. Such peripheral devices include (but are not limited to) keyboards, mice, printers, scanners, joysticks or other types of game controllers, media recording devices, external storage devices, network interface cards, and so forth. At least some of the peripheral devices that may be coupled to I/O unit 13 via a corresponding peripheral bus may assert memory access requests using direct memory access (DMA). These requests (which may include read and write requests) may be conveyed to north bridge 12 via I/O interface 13.

In the embodiment shown, IC 2 includes a graphics processing unit 14 that is coupled to display 3 of computer system 10. Display 3 may be a flat-panel LCD (liquid crystal display), plasma display, a CRT (cathode ray tube), or any other suitable display type. GPU 14 may perform various video processing functions and provide the processed information to display 3 for output as visual information.

Memory controller 18 in the embodiment shown is coupled to north bridge 12, and in some embodiments, may actually be a component of north bridge 12. Memory controller 18 may receive memory requests conveyed from north bridge 12. Data accessed from memory 6 responsive to a read request (including prefetches) may be conveyed by memory controller 18 to the requesting agent via north bridge 12. Responsive to a write request, memory controller 18 may receive both the request and the data to be written from the requesting agent via north bridge 12. If multiple memory access requests are pending at a given time, memory controller 18 may arbitrate between these requests.

Memory 6 in the embodiment shown may be implemented in one embodiment as a plurality of memory modules. Each of the memory modules may include one or more memory devices (e.g., memory chips) mounted thereon. In another embodiment, memory 6 may include one or more memory devices mounted on a motherboard or other carrier upon which IC 2 may also be mounted. In yet another embodiment, at least a portion of memory 6 may be implemented on the die of IC 2 itself. Embodiments having a combination of the various implementations described above are also possible and contemplated. Memory 6 may be used to implement a random access memory (RAM) for use with IC 2 during operation. The RAM implemented may be static RAM (SRAM) or dynamic RAM (DRAM). Type of DRAM that may be used to implement memory 6 include (but are not limited to) double data rate (DDR) DRAM, DDR2 DRAM, DDR3 DRAM, and so forth.

Memory controller 18 in the embodiment shown may operate at a lower clock frequency than memory 6. In some cases, the frequency of the clock signal received by memory controller 18 may be variable, e.g., in a range from one half the memory clock frequency up to equal the memory clock frequency. When the clock signal received by memory controller 18 is different than that received by memory 6, synchronization penalties and other inefficiencies may contribute to the latency of memory reads. These efficiencies may compound when memory controller 18 operates at lower clock frequencies. Moreover, these inefficiencies may introduce uncertainties into the read path when determining the latency for receiving valid data from a read. Memory controller 18 and memory controller 6 may both contain various units which may be used to reduce these uncertainties and thereby reduce the read latency. The operation of these units will now be discussed in further detail.

Figure 2:
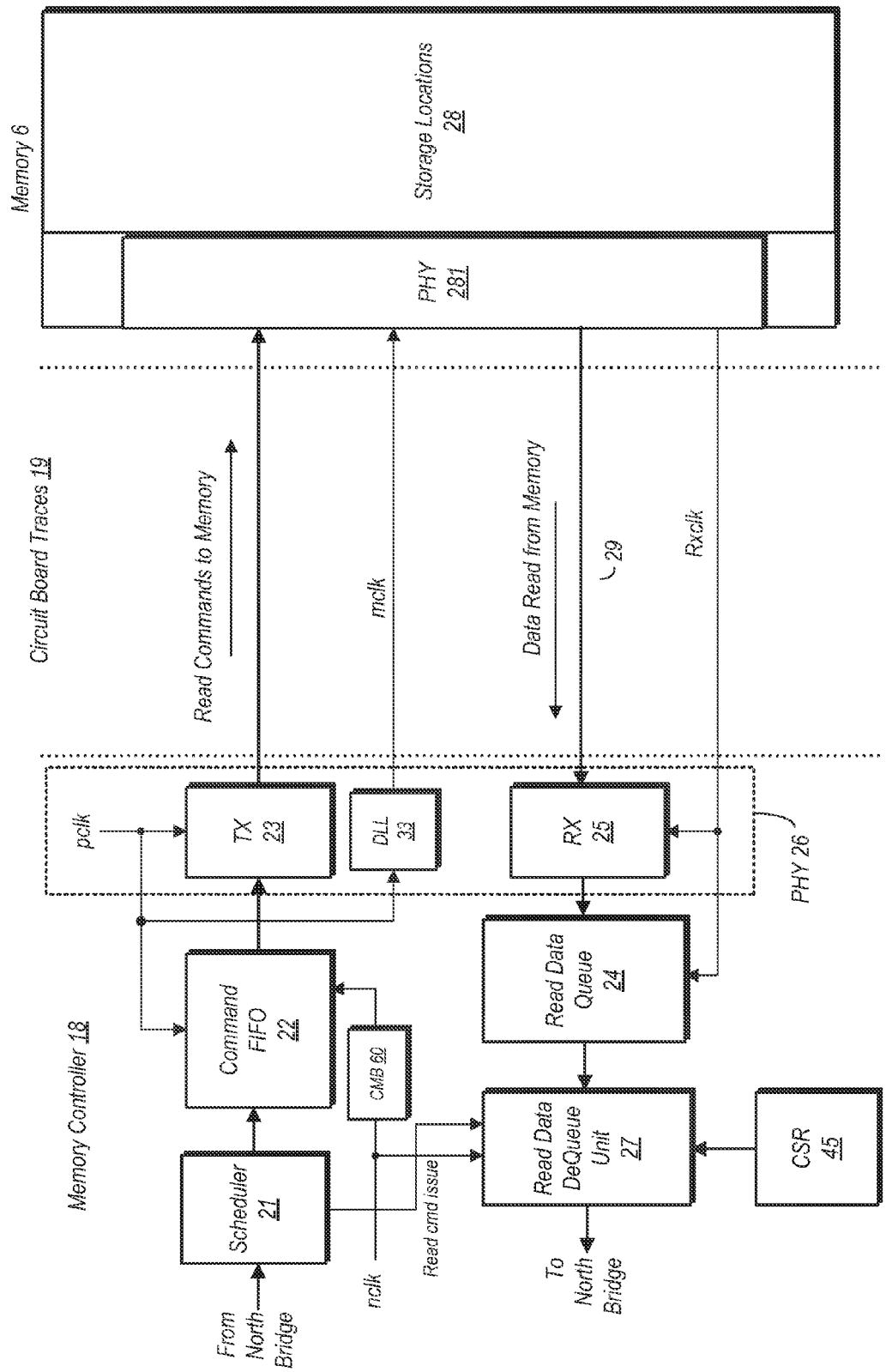
FIG. 2 is a block diagram of one embodiment of a memory subsystem including a memory controller on an SOC and a memory.

Memory Subsystem:

FIG. 2 is a block diagram illustrating one embodiment of a memory subsystem and various components thereof. In particular, FIG. 2 illustrates components in a memory read path that may contribute to memory read latency.

Memory 6 in the embodiment shown may be divided into a group of storage locations 28 and a physical interface 281. It is noted that in some embodiments, storage locations 28 and physical interface 281 may be distributed among a number of different memory modules (e.g., dual inline memory modules, or DIMMs). Physical interface 281 may provide an interface for receiving signals from memory controller 18 and for transmitting signals to the same. Each of storage locations 28 may be arranged for storing data written to memory 6.

Reads of data stored in memory 6 may be initiated by writing commands to command FIFO 22, which may be received from north bridge 12. The commands may be written into command FIFO 22, by scheduler 21, at a rate determined by the north bridge clock signal, nclk, as conditioned by command bandwidth unit 60, as will be discussed in further detail below. The various commands written to command FIFO 22 may include commands required to cause reads and writes to memory 6, including row address strobe (RAS) and a column address strobe (CAS) commands. Commands may be read from command FIFO at a rate determined by another clock signal, pclk. The pclk signal is related to a memory clock signal, mclk, which will be discussed in further detail below. In this particular example, the frequency of the pclk signal may be twice the mclk signal. Furthermore, although the rate of command reads may be determined by the pclk signal, the effective rate at which commands are read may actually be at the mclk rate. This will also be explained in further detail below.

In the embodiment shown, memory controller 18 also includes a physical interface 26. Transmitter 23 and receiver 25 are components of physical interface 26, which also includes additional components to be discussed in conjunction with FIG. 3. Commands read from command FIFO 22 may be provided to transmitter 23, which may then transmit the commands across circuit board traces 19 to physical interface 281 of memory 6. Transmitter 23 is also coupled to receive the pclk signal. However, commands may be conveyed to memory 6 at the mclk rate.

It is noted that address information may be included in the commands conveyed from memory controller 18 and memory 6. Addresses may be conveyed during both read and write operations to indicate the memory address from which data is to be read or to which data is to be written. In such embodiments, the address may be sent in two parts, a row address and a column address, over two separate cycles.

On the return side, data read from memory may be conveyed from the memory physical interface 281 to receiver 25 via data bus 29. Data bus 29 may include a number of signal paths/traces equal to the number of bits of data that may be read from memory 6 during a given read cycle. Receiver 25 is configured to operate according to a receive clock, Rxclk. The receive clock, when active, may be a pulse train having the same frequency as the mclk. However, the receive clock may in some embodiments only be active when read operations are in progress. Otherwise, the receive clock may remain inactive.

Receiver 25 may forward received data into read data queue 24. Data may be held in read data queue 24 after being received until a specified number of cycles (from when the corresponding read command was placed into command FIFO 22) of the nclk signal have elapsed. After the specified number of cycles has elapsed, read data de-queue unit 27 may forward the data stored in read data queue 24 to north bridge 12, where it may then be routed to its requestor. This may allow time for arrival at and storage in read data queue 24 of all requested data, including that which arrives via the slowest signal path from memory 6. Accordingly, the latency for reading data may be expressed as a number of nclk cycles after which received data is valid subsequent to the issuance of a read command from scheduler 21 to command FIFO 22. The specified number of nclk cycles may be stored in control/status register (CSR) 45, which may store additional information as will be discussed below.

During memory reads, a command is issued from command FIFO 22, and is transmitted by transmitter 23 to physical interface 281, and subsequently data is read from one of storage locations 28. The data read is then returned to receiver 25 and written into read data queue 24, and subsequently de-queued by read data de-queue unit 27. Various source of uncertainty exist in this path, such as lane skew that may occur in the signal paths of data bus 29. It is desired to reduce the latency of memory reads, and thus desirable that sufficient time is allowed for data to be safely read with all uncertainties factored in, without incurring additional latency. Data received by read data queue 24 is not considered valid until all of the data bits from the requested address have been received and stored into read data queue 24. Attempts to read the data prior to all bits of the requested address may yield an erroneous result. Read data de-queue unit 27 in the embodiment shown may be configured to allow a specified amount of time (expressed in terms of nclk cycles, as noted in the previous paragraph) to elapse before forwarding data from read data queue 24 to north bridge 12. Furthermore, the actual minimum safe read latency may not be an integral number of nclk cycles, although for operational purposes, it may be rounded up to an integral value. For example (assuming that the nclk signal is running at one half the frequency of the mclk signal), if the overall read latency is 9.25 nclk cycles when providing a full mclk cycle of setup time, the number of nclk cycles is rounded up to the next integral value of 10. Therefore, data may be read from read data queue 24 at 10 nclk cycles subsequent to the corresponding read command having been written into command FIFO 22.

During a system startup routine, a latency training procedure may be conducted to determine the number of nclk cycles that elapse from the time a command is written into command FIFO 22 to the time that valid data is present in read data queue 24 such that it may be read by read data de-queue unit 27 (i.e. this may be defined as the read latency). The latency training procedure may be performed in a manner so as to force delays resulting from uncertainties in the read path to their respective minimums and thus reduce the read latency. When this number is determined experimentally, calculated uncertainties may be added thereto, and the resulting value may be programmed into CSR 45. In some cases, multiple values may be stored, wherein each of the multiple values corresponds to, e.g., different command scheduling uncertainties. After exiting the startup routine and conducting normal memory reads, read data de-queue unit 27 may de-queue and forward data from read data queue 24 after the number of nclk cycles specified by the information in CSR 45 have elapsed. Read data de-queue unit 27 may determine when the programmed number of nclk cycles has elapsed in reference to a signal (read cmd issue') received from scheduler 21 when the read command is forwarded to command FIFO 22, and may use this number to determine when data can be safely de-queued from read data queue 24. It is further noted that the latency training procedure may be performed at other times, such as when exiting a sleep state.

Figure 3:
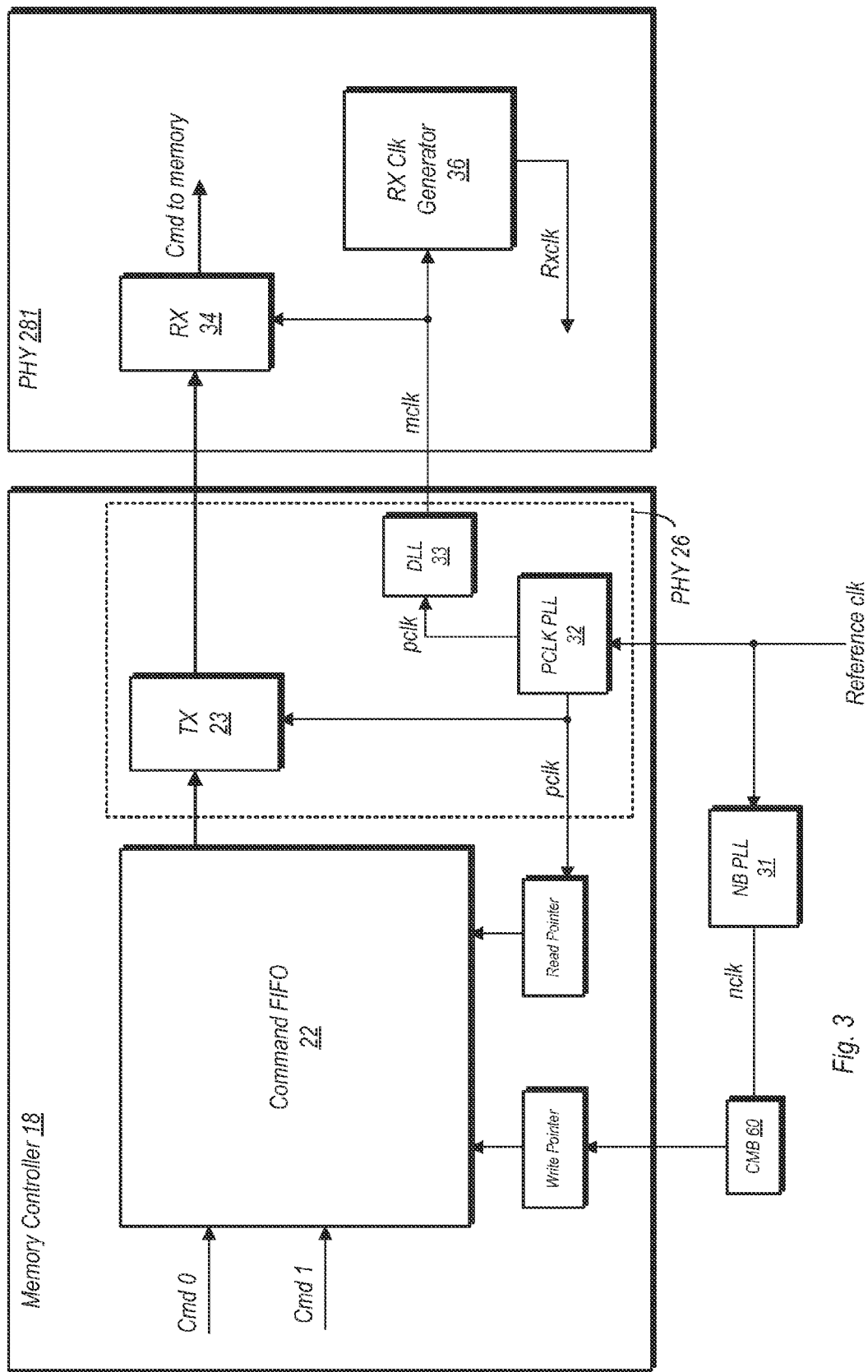
FIG. 3 is a block diagram illustrating a portion of one embodiment of a memory controller coupled to the physical interface of a memory.

FIG. 3 is a block diagram illustrating further aspects of memory controller 18 and physical interface 281 of memory 6. In the embodiment shown, a reference clock may be provided to north bridge PLL (phase locked loop) 31 and to pclk PLL 32. North bridge PLL 31 may produce the nclk signal, which is provided to north bridge 12 and various components thereof, including to memory controller 18. In the embodiment shown, a write pointer to command FIFO 22 may be advanced at a rate determined by nclk, as conditioned by a command bandwidth matching (CMB) unit 60, which will be described in further detail below.

Pclk PLL 32 may generate the pclk signal based on the received reference clock signal. The pclk signal may be provided to various components of physical interface 26, including transmitter 23. Commands conveyed from command FIFO 22 via transmitter 23 may be received by receiver 34 of the memory physical interface 281 and conveyed to other circuitry in memory 6 where they may be interpreted to effect the desired operation (e.g., a memory read). The pclk signal may also be provided to delay locked loop (DLL) 33, which is used to generate the mclk signal. In one embodiment, the mclk (or memory clock) signal may operate at one half the frequency at which pclk operates. The memory clock signal may be conveyed to the memory arrays (e.g., storage locations 28) and to receiver 34 for use in synchronizing read and write operations. In addition to being used to generate the receive clock and the mclk signals, the pclk signal may also be conveyed from pclk PLL 32 to command FIFO 22, where it is used to advance a read pointer.

As noted above, the frequency of the mclk signal in one embodiment is one half that of the pclk signal. The frequency of the nclk signal may be variable, and in this particular embodiment, may vary in a range from one half that of the mclk signal up to a frequency equal that of the mclk signal. Thus, the frequency of the pclk signal may be up four times that of the nclk signal (i.e. when the nclk signal is running at a frequency one half of the mclk signal).

In the embodiment shown, command FIFO 22 of memory controller 18 is coupled to receive commands via two separate paths, Cmd 0 and Cmd 1. During each command write cycle, two commands may be written into command FIFO 22. Although the read pointer is advanced at a rate determined by the pclk signal, commands may be read from command FIFO 22 at an effective rate of the mclk signal. Accordingly, during command writes, each command may be written into two consecutive storage locations of command FIFO 22. As a result, the read pointer may cause the same command to be read from command FIFO 22 on two consecutive cycles of the pclk signal (and thus a new command is read every other cycle), thereby causing FIFO reads at an effective rate of the mclk signal. This property in the embodiment shown may enable control of the command setup time, with respect to the mclk signal, by adjusting the phase relationship between the nclk and mclk signal. This in turn may reduce one source of uncertainty in the read path. A mechanism and method for adjusting the command setup time will now be discussed in reference to FIGS. 4 and 5.

Clock Phase Alignment to Control Setup Time:

Since the mclk signal is derived from the pclk signal, their edges are substantially aligned. Every edge of mclk corresponds to a rising edge of pclk. While the memory controller is in reset, nclk, mclk, and pclk are all running Reset initially deasserts in the nclk domain, which starts the write pointer of command FIFO 22 running This de-assertion is synchronized into the pclk domain, and that de-assertion starts the read pointer of command FIFO 22 running Pclk is used instead of mclk because it is faster, which leads to a smaller synchronizer uncertainty. The initial value for the write pointer is chosen so that when the read pointer starts running (after the synchronizer delay) at location 0, the pointer separation will be the minimum safe separation, given the delays in the path and the synchronizer uncertainty. Command FIFO 22 may then enter operational mode, with commands being written thereto During operation of the system discussed above, memory 6 may sample received commands on a rising edge of the mclk signal. Commands may be driven to memory 6 for a full mclk cycle, which is equal to 2 pclk cycles. In memory 6, each received command may require a setup time of either one half of an mclk cycle of a full mclk cycle relative to the sampling mclk edge. Command FIFO 22 resets and reads from the FIFO in the pclk domain to support the lower synchronization uncertainty described above. Command FIFO 22 may logically operate at the rate of the mclk signal by writing each command thereto twice, in consecutive locations. Therefore, the output of command FIFO 22 (to transmitter 23) may effectively change at the rate of the mclk signal, since the pclk signal may read the same command out of two consecutive storage locations. Based on the setup requirements above, the command must be driven out of the command FIFO 22 either from rising mclk to rising mclk (full cycle setup) or falling mclk to falling mclk (half cycle setup). On every nclk cycle, four locations are written into command FIFO 22, and one location is read out every pclk cycle. Since the read pointer was reset on an arbitrary pclk cycle, which could have corresponded to either a rising or falling edge of an mclk, each read of FIFO 22 could occur on either a rising or falling mclk edge. Setup time can be controlled by writing commands into FIFO 22 the appropriate number of FIFO 22 locations (one for half cycle setup, two for full cycle setup) prior to the rising edge of mclk, if it is known which reading pclk edge corresponds to a rising mclk. Such a determination may be made by the apparatus to be discussed in conjunction with FIG. 5.

Figure 4:
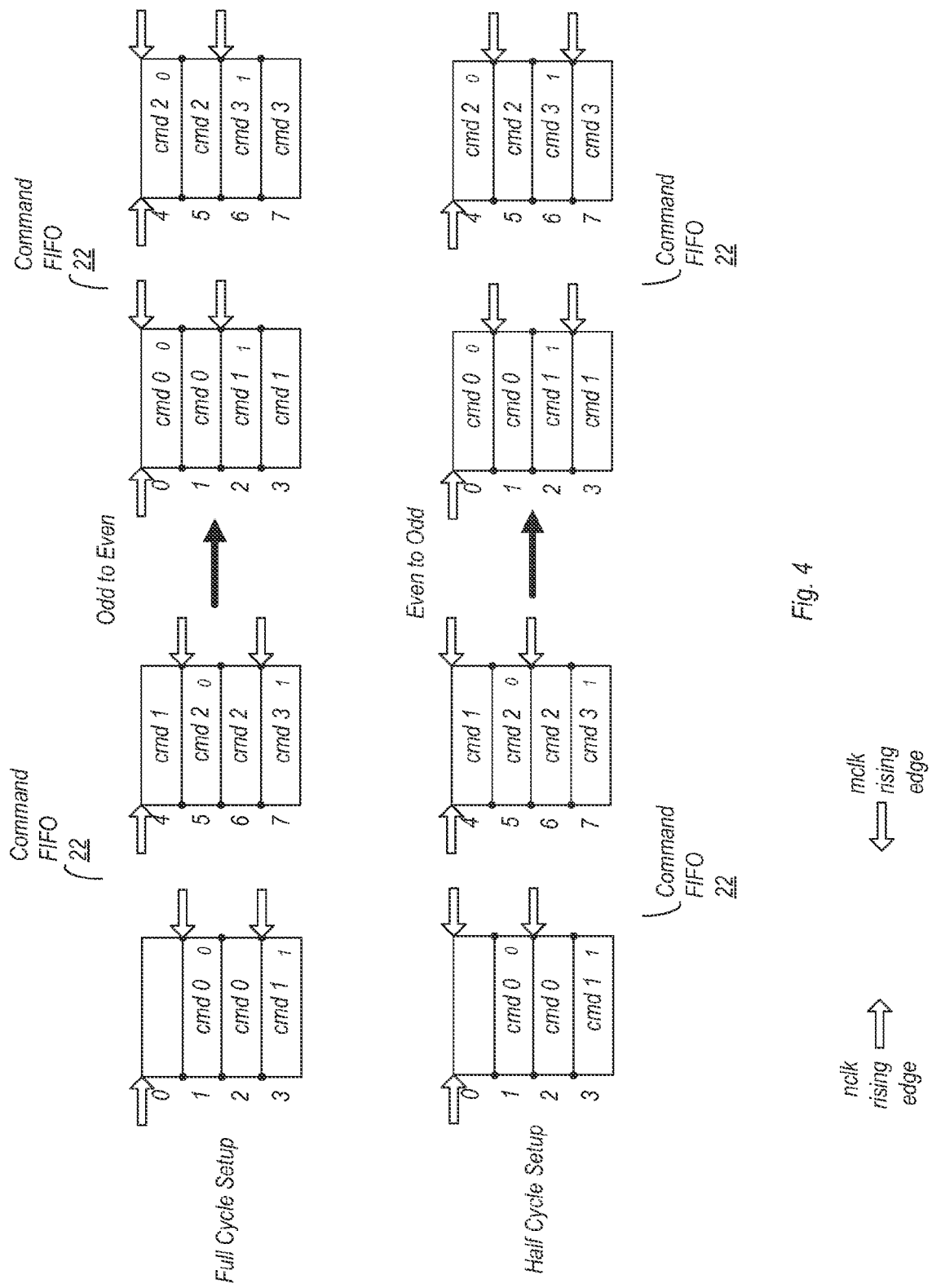
FIG. 4 is a diagram illustrating a method for obtaining a desired setup time for commands written to a command FIFO (first-in, first-out memory) for one embodiment of a memory controller.

FIG. 4 illustrates the affect of aligning the clock signals to a desired alignment. Within each quadrant of the drawing, we show eight FIFO entries in command FIFO 22. Each group of four entries is written by a single nclk cycle. Every pclk edge reads one entry. Since every other pclk corresponds to an mclk rising edge, an mclk rising edge may occur after the first and third entry, or after the second and fourth entry. These two situations are defined as, respectively, odd and even for the purposes of this discussion. As noted above, one embodiment of the command FIFO 22 described herein may have the same command written to two consecutive locations such that the pclk signal can be used to advance the read pointer while still enabling reads to be conducted at the mclk rate. Thus, in the example shown, each location in which a command is listed (e.g., cmd 0 in location 1, upper left hand corner) is followed by a second location storing the same command (e.g., location 2, upper left hand corner). Thus, as the read pointer advances through these two locations, it will read the same command both times. If the clock signals are initialized with an alignment that is not desired, it may not be possible to write a command to entry 0 as shown in the various instances of the exemplary command FIFO 22 while providing the required amount of setup time. The inability to write to entry 0 in command FIFO 22 may in turn add latency to the read cycle, since entry 1 is read from command FIFO 22 one pclk cycle later than entry 0. To remedy this situation, a cycle of the mclk may be skipped, or the mclk signal may otherwise be inverted to change its phase by 180°. This may in turn place the clock signals in the desired alignment and enable the writing of commands to entry 0, thereby allowing sufficient setup time while also reducing the read latency by an amount equal to one pclk cycle (which is one half of an mclk cycle).

In the upper example shown in FIG. 4, a full cycle of setup time is desired, while the initial alignment (left hand side of page) is odd. However, since the rising edge of the mclk signal occurs approximately one half mclk cycle subsequent to the rising edge of the nclk signal, entry 0 is not used, since a command written to that location will not meet the setup time requirement. Accordingly, the first instance of command 0 ('cmd 0') is written to entry 1, with the second instance being written to entry 2. Command 0 may be read from command FIFO 22 at the next rising edge of the mclk signal subsequent to its writing into command FIFO 22. Since entry 0 is not used in this case, one half mclk cycle of latency is added to the read time.

Moving to the top right hand side of the drawing, the mclk signal has been inverted or phase shifted by 180°. Accordingly, command 0 may be written to entry 0 and entry 1 on the rising edge of the nclk. The next rising edge of the mclk cycle subsequent to writing command 0 into command FIFO 22 occurs at approximately one full mclk cycle subsequent to the rising edge of the mclk cycle. Thus, each of the commands written into command FIFO 22 has one full mclk cycle of setup time, while the shift in the phase of the mclk signal results in a latency reduction of one half mclk cycle since entry 0 is used to receive command 0.

In the lower example shown in FIG. 4, the initial alignment (shown on the left hand side) is even, when the desired alignment is odd. In this alignment, the rising edges of the nclk and mclk are somewhat in alignment, with the next rising edge of the mclk signal occurring approximately one full mclk cycle subsequent to the rising edge of the nclk signal. Thus, to write command 0 such that it only uses one half mclk signal of setup time, it may be placed in entry 1. This alignment may thus effectively add one half mclk cycle of read latency since each subsequent command is also shifted in the same manner as command 0.

Moving to the lower right hand portion of the page, the desired odd alignment is achieved by shifting the mclk signal by 180°. In this case, the first rising edge of the mclk signal occurs at approximately one half an mclk cycle subsequent to the rising edge of the nclk signal. Accordingly, each command may be written to locations starting with a first instance of command 0 in location 0. Since the alignment is odd in this case, the commands have one half mclk cycle of setup time after being written into the FIFO. Similar to the previous example, the phase shift of the mclk signal that enables command 0 to be written into entry 0 may result in a latency reduction of one half an mclk cycle.

It is noted that in both of the above examples, it is possible for the clock signals to initialize with the relationships depicted in the right-hand side of FIG. 4. In such cases, no further adjustment is necessary, and thus the mclk signal is not phase shifted by 180°.

Figure 5:
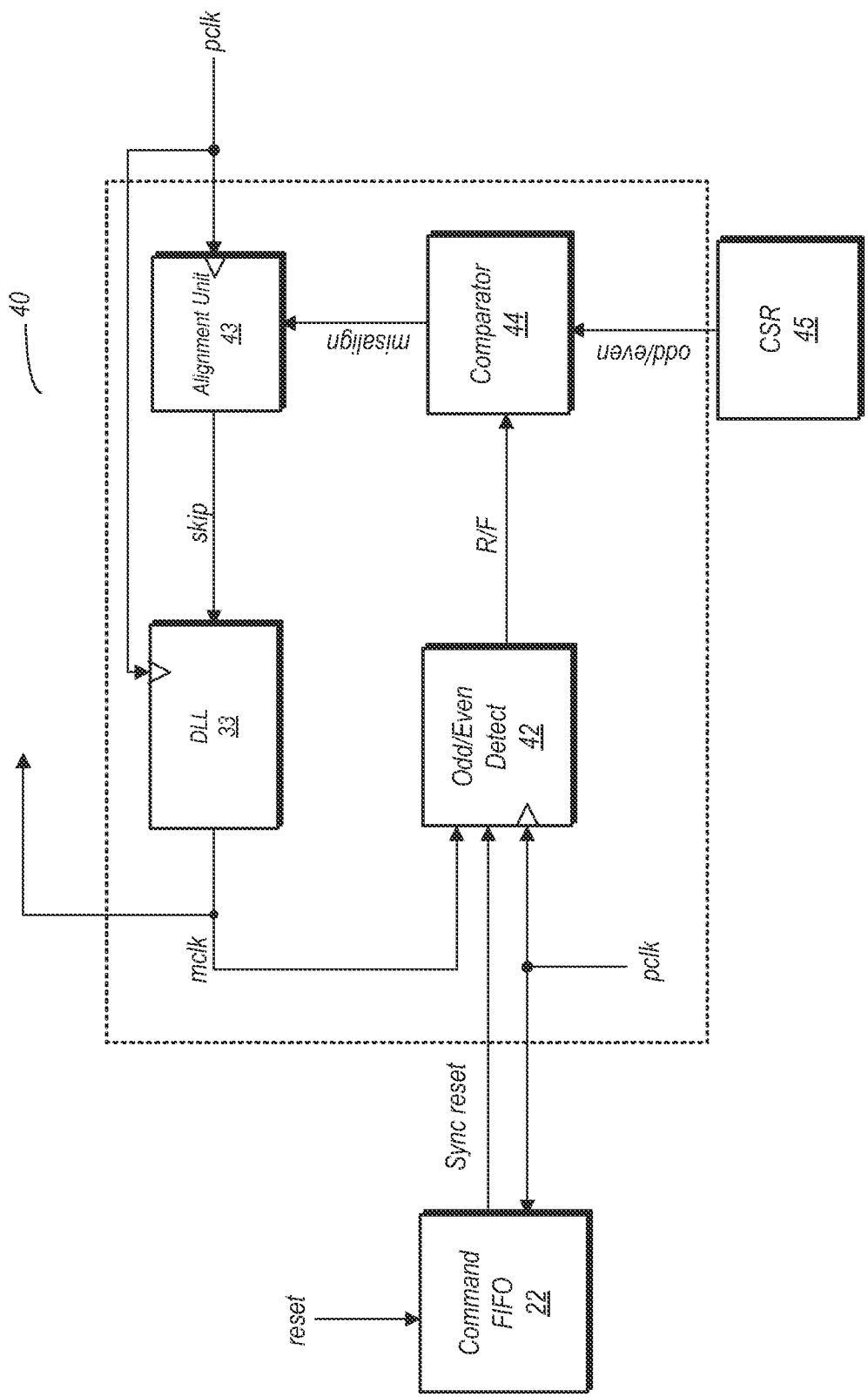
FIG. 5 is a block diagram illustrating one embodiment of a phase adjustment apparatus.

Turning now to FIG. 5, an apparatus for adjusting to a desired mclk phase is shown. Adjusting the phase may be used to vary the latency required to achieve the setup time for commands conveyed from command FIFO 22 to physical interface 281. This may remove some fixed latency in the read path described in conjunction with FIG. 3 and thus enable an overall reduction of read latency.

The desired command setup time may be determined at least in part by the signal path used to implement the read path discussed above. When the read path includes signal traces on a printed circuit board (PCB), the characteristics of the board may affect the required setup time. Some PCBs may be designed and/or manufactured with loose specifications. Accordingly, signal trace widths may vary significantly, affecting the impedance and therefore the timing of signals transmitted along those signal traces. Similarly, some memory modules (e.g., DIMMs, or dual inline memory modules) may have significant loading, which may also introduce a source of delay. When IC 2 is implemented in such a system, it may be desirable to provide more setup time for commands to ensure the commands are properly interpreted. In contrast, some PCB's may be designed and manufactured with tight specifications (e.g., less variation in trace width, etc.). Furthermore, some systems may be populated with memory modules that have small loads. Accordingly, less command setup time may be required in such implementations. The memory modules used and the PCB traces for the system in which IC 2 is implemented may determine whether or not a full cycle or a half cycle of mclk setup time is required.

The desired phase relationship may be programmed into CSR 45. To obtain a setup time equal to a full mclk cycle, it is desired that the alignment is even, as illustrated in FIG. 4. To provide a setup time equal to one half an mclk cycle, it is desired that the alignment be odd, as illustrated in FIG. 4. Every command entry is read on a rising pclk, with the arrows on the right indicating which rising edges of the pclk signal correspond to rising edges of the mclk signal.

In the embodiment shown, phase adjustment unit 40 includes an odd/even detect unit 42 coupled to receive both the mclk and pclk signals, along with a synchronized reset signal (synchronized to pclk) from command FIFO 22. Command FIFO 22 may provide the synchronized reset signal responsive to receiving a reset signal. When exiting the reset state, the reset signal may be de-asserted. Thus, exiting the reset state for odd/even detect unit 42 may be synchronized to the pclk signal, which is also received by that unit as a clock signal. Odd/even detect unit 42 is also coupled to receive the mclk signal, which is treated as a data signal for odd/even detection purposes. Once the reset is released, odd/even detect unit 42 may determine whether the alignment is odd or even. In this particular embodiment, if the mclk signal is low (e.g., logic 0) when sampled at a rising edge of the pclk signal, the alignment is determined to be odd, as the next mclk edge is a rising edge. If the mclk signal is sampled high (e.g., logic 1) on the rising edge of the pclk signal, the alignment is determined to be even, as the next edge of the mclk signal is a falling edge. Responsive to determining the alignment, odd/even detect unit 42 may output an indication of whether the next mclk edge is a rising or falling edge ('R' for rising, 'F' for falling in this example). This indication may be received by comparator 44, which may receive an indication from CSR 45 as to whether the desired alignment is odd or even. Comparator 44 may compare these two values to determine if the actual alignment is equal to the desired alignment. If the detected alignment is equivalent to the desired alignment, no further action is required.

If the actual alignment and the desired alignment are different, comparator 44 may assert a corresponding indication ('misalign'). The indication of misalignment may be received by alignment unit 43, which is coupled to receive the pclk signal. The pclk signal is also provided to DLL 33, in order to generate the mclk signal. Responsive to receiving the indication of misalignment from comparator 44, alignment unit 43 may assert the skip signal. When an asserted skip signal is received by DLL 33, the phase of the resulting mclk signal may be shifted by 180°. This in turn may change the alignment from even to odd, or from odd to even.

Phase adjustment unit 40 may perform the procedure described above during a startup routine, since it is not predictable as to how the clocks will be aligned at the beginning of operation. Once set to the desired state, the alignment may be maintained by phase adjustment unit 40. The procedure may be repeated at times when the memory exits a sleep state for which the mclk signal was gated and the memory was placed in a self-refresh mode.

It is noted that while the discussion above focuses on embodiments based on specified frequency relationships between the various clock signals, alternate embodiments are also possible and contemplated utilizing clock signals having different frequency relationships with respect to each other.

Command Bandwidth Matcher for Command FIFO Writes:

In the embodiment shown in FIG. 3, two memory commands are written into command FIFO 22 every nclk cycle. A read command can be scheduled to start in either one of these slots denoted as Slot 0 or Slot 1, as shown in FIG. 4 (see right hand side of each entry). Reasons for scheduling in Slot 1 may include odd delays of RAS to CAS delays specified by the dual-inline memory module (DIMM) populated in the system. For example, if an activate command to open a page is scheduled in an even slot, and the activate-to-read delay is nine mclk cycles, it would be necessary for the controller to schedule the read in an odd slot. Nominally scheduling a read command in Slot 1 would require us to add a time equal to one mclk period in absolute time to the read latency when compared to the read latency to the commands scheduled in Slot 0. This is because the read pointer reads out the commands written in odd slots one mclk period later than those written into even slots in command FIFO 22 of FIG. 3. However, since read data de-queue unit 27 in FIG. 2 counts down in integral number of nclk cycles, an additional one mclk cycle of delay may or may not result in 1 extra nclk cycle of latency. Thus, scheduling a read command in Slot 1 may or may not increase the latency compared to a read command written in Slot 0 once the delay value is rounded up to an integral number of nclk cycles. This results in an uncertainty in the read latency of the system. In prior art, this uncertainty would be added as one fixed nclk cycle as slot uncertainty. However, the various embodiments disclosed herein include hardware that may provide hooks to the training algorithm to ascertain latency on each slot separately by forcing commands to be scheduled into a given slot during training. Once training is complete, the respective latencies for each of Slot 0 and Slot 1 are stored in respective locations of CSR 45. During operations in a normal mode, read data de-queue unit 27 may track if a read that is being de-queued was issued in Slot 0 or Slot 1, and may select the correct amount of latency associated with that command. Since the various embodiments discussed herein utilize two command writes per nclk cycle, the bandwidth ratio between nclk and mclk is limited to two. However, embodiments are possible and contemplated wherein the bandwidth ratio may be extended to a greater number of command slots to accommodate a higher ratio of clock speeds.

Figure 6:
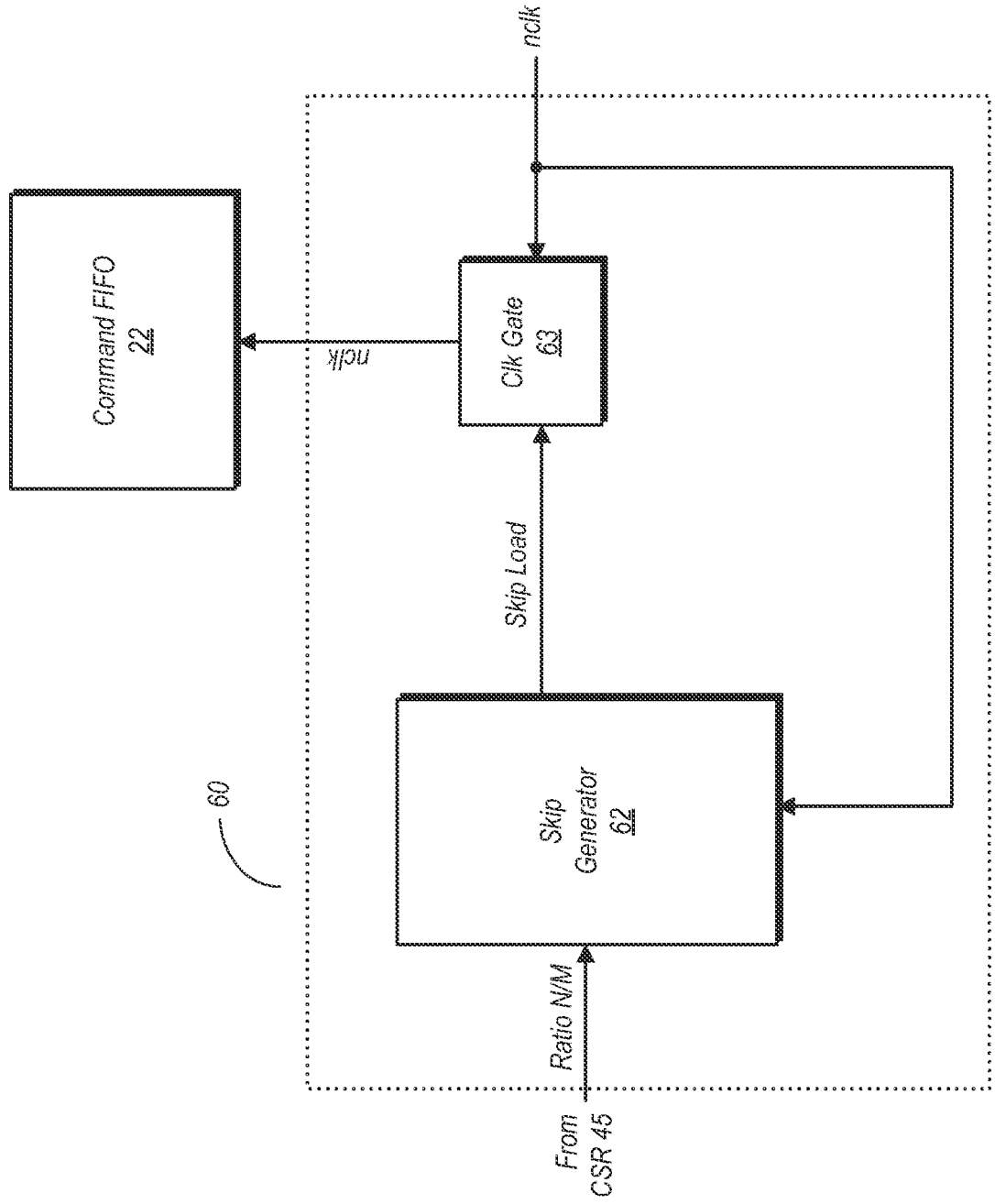
FIG. 6 is a block diagram of one embodiment of a command bandwidth matching unit used for periodically skipping writes to a command FIFO.

FIG. 6 is a block diagram of one embodiment of a command bandwidth matching unit 60 used for periodically skipping writes to the command FIFO 22 when the nclk domain bandwidth is greater than the pclk domain bandwidth. In this particular example, the potential write bandwidth exceeds the read bandwidth when the nclk frequency is more than one half the mclk frequency, and thus skipped write cycles may be used to match the bandwidths.

In the embodiments previously described the write and read bandwidths may be matched when the nclk frequency is one half of the mclk frequency. This is because two commands are written each nclk cycle, while one command is read each mclk cycle in the previously described embodiments. Thus, the write and read pointers advance at the same rates. However, if the nclk frequency is increased to a value that is greater than one half the mclk frequency in the embodiment of e.g., FIG. 3, then the write pointer will advance at a faster rate than the read pointer. Left unchecked, this would result in the write pointer overwriting a location before the previously written data has been read. Accordingly, command bandwidth unit 60 may cause writes to command FIFO 22 to be periodically skipped when the write pointer is otherwise advancing at a faster rate than the read pointer.

In the embodiment shown, command bandwidth matching unit includes a skip generator 62 coupled to receive a bandwidth ratio value from CSR 45. The bandwidth ratio may be determined by multiplying the nclk frequency by two (since two commands are written each nclk cycle) and dividing this product by the mclk frequency. Based on the result, a ratio of two integral numbers may be determined. For example, consider a situation where the mclk frequency is 1 GHz and the nclk frequency is 750 MHz. Multiplying the latter figure by two yields a value of 1.5 GHz; dividing it by the mclk frequency yields a value of 1.5. This translates into an integral ratio, N/M, of 3/2.

Skip generator 62 may generate a skip pattern to enable certain writes to be skipped in order that the write pointer not overtake the read pointer. In general, the ratio received by skip generator may enable writes to occur for every M of a total of N nclk cycles. Skip generator 62 thus prevents writes on N-M of every N nclk cycles. In addition to determining the number of writes (and number of skips) in a given group of N nclk cycles, skip generator 62 may also attempt to space the skips at specific points in order to prevent the write pointer from overtaking the read pointer. Thus, using the example of the previous paragraph (where N/M=3/2), skip generator 62 may enable writes to occur on every 2 of 3 nclk cycles, while skipping one write every 3 nclk cycles. Thus, in this example, skip generator 62 may generate a pattern of write, write, skip; write, write, skip; etc. For each nclk cycle for which a write is to be skipped, skip generator 62 may assert a skip signal ('Skip Load').

Clock gate 63 in the embodiment shown is coupled to receive both the nclk signal and the skip signal from skip generator 62. With respect to the nclk signal, clock gate 63 is in the path between its received nclk signal and that provided to command FIFO 22. When skip generator 62 asserts a skip signal, clock gate 63 may block the nclk signal from being provided to command FIFO 22, thereby inhibiting a write of a command thereto. This effectively stalls the write pointer from advancing when the nclk signal is inhibited, and thus prevents it from overtaking the read pointer.

Although not explicitly shown in this drawing, the contents stored in CSR 45 may include a value indicative of a minimum safe distance between the read and write pointers. The minimum safe distance may be defined as that distance where the write pointer is as close as possible to the read pointer without having the ability to overwrite commands that have not yet been read from command FIFO 22. The distance between the write and read pointers may decrease when the write pointer is stalled, but may increase when the write pointer is advancing. This portion of the variation of pointer separation may be defined as skip delay. Skip uncertainty may be defined herein as the maximum variation in skip delay. Because the skip pattern is deterministic, during training the command insertion may be delayed until skip delay is at a minimum. Thus, another source of uncertainty may be eliminated. Typical prior art systems simply add an arbitrary skip error to a trained latency value to compensate for the uncertainty regarding the distance between the read and write pointers. The arbitrary skip error value added in such prior art systems may add to the skip uncertainty and may thus lead to double counting the skip error.

Figure 7:
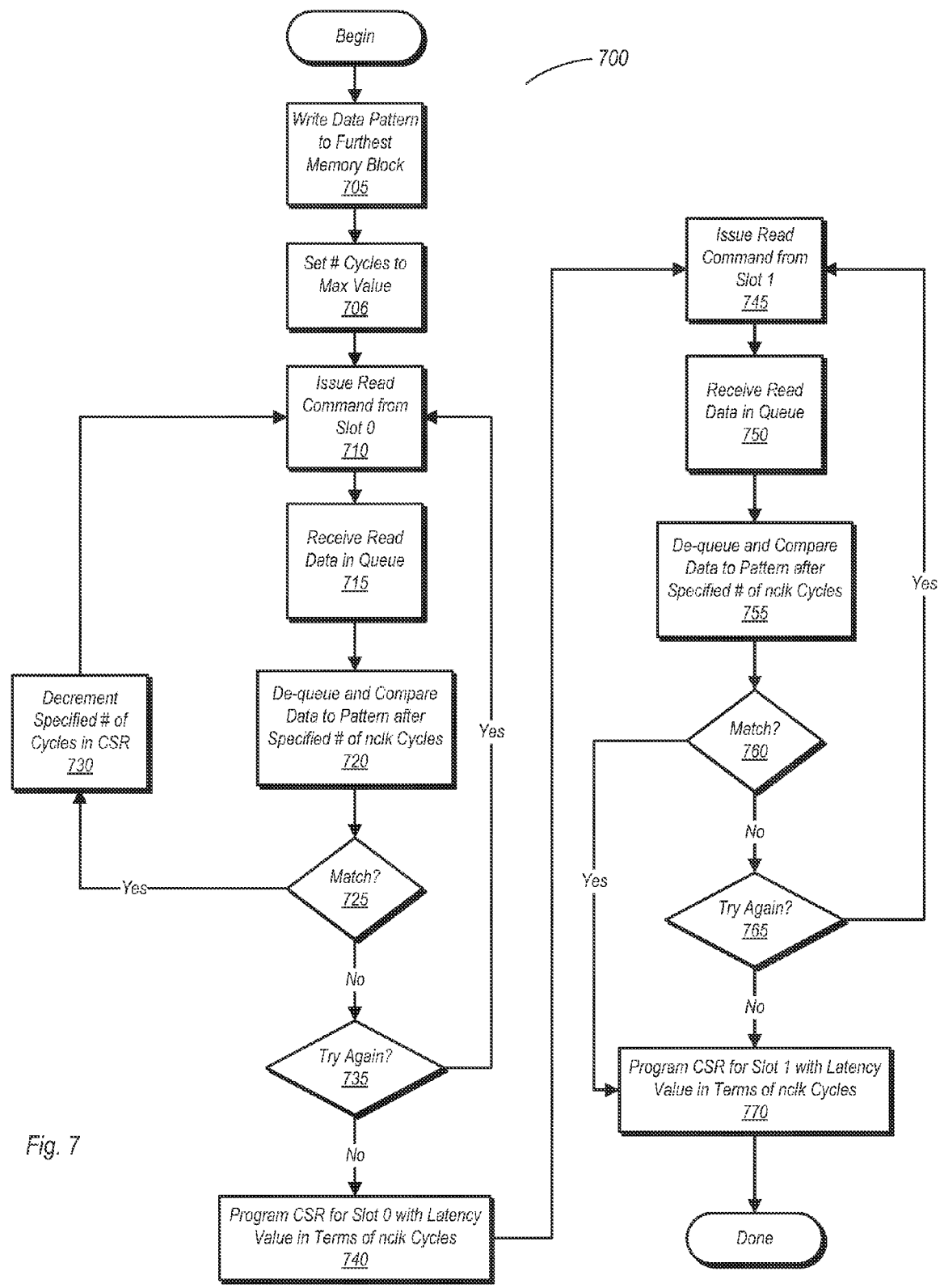
FIG. 7 is a flow diagram of one embodiment of a method for training latency for reads in a memory subsystem.

Method for Latency Training:

FIG. 7 is a flow diagram of one embodiment of a method for training the latency of a memory read path. They method may be utilized with the read path shown in FIG. 3, and in general, with a wide variety of memory systems. Method 700 may initially be performed during a system startup (e.g., boot) routine. However, it is also possible and contemplated that method 700 may be performed at other times, such as when waking up from a sleep state, changing the frequency of one of the clock signal (e.g., nclk), and so forth.

Method 700 begins with the writing of a known data pattern to a memory block that has the longest response latency (block 705). In some cases, the memory block having the longest response latency may be that which is physically the furthest from the memory controller, although this is not necessarily the case in all instances. The memory block may include one or more addresses to which the known data pattern is written. In conjunction with the write operation, the number of clock cycles (e.g., nclk cycles) may be set (in the CSR) to a maximum value (block 706). After the write operation is complete, a read command may be issued (block 710). The read command may be issued from slot 0 of a command FIFO, such as command FIFO 22 shown in FIG. 2-4. Subsequent to its issuance by the command FIFO, the read command may be received by the memory. Responsive to receiving the read command, the memory may read data from the memory block to which the known data pattern was written.

Responsive to the read operation, the data of the known data pattern may be accessed from the block to which it was written and conveyed back to the memory controller, where it may be received in a data queue (block 715). After a specified number of nclk cycles have elapsed (as indicated by a value stored in a register such as CSR 45), the data received in the data queue may be de-queued and compared to the known data pattern (block 720). If the data matches (block 725, yes), then the specified number of clock cycles may be decremented (block 730), and the method may then return to block 710. The issuing of the read command (block 710), receiving the data read from the memory (block 715), and the de-queue/compare operations (block 720) may be repeated for each of a number of iterations. Each iteration may include the decrementing of the specified number of clock cycles (block 730). Accordingly, the memory read latency, expressed as a number of nclk cycles, may be reduced for each iteration.

If the de-queue/compare operation of block 720 results in a mismatch (block 725, no), a decision to attempt another read cycle at the same latency may be attempted (block 735, yes). The repeated attempt at the latency that originally produced the mismatch may be performed to determine if a read operation at this latency may sometimes yield a match or instead always results in a mismatch. This loop may be performed a number of times in order to establish confidence in the result. For example, if a mismatch occurs and one or more subsequent attempts at the same latency result in the de-queued data matching the data pattern, it may be concluded that the latency value is one which may sometimes result in a match and sometimes in a mismatch. Additional reads may be performed at one or more lower latencies in order to probe for latency value at which mismatches consistently occur. Thus, by performing additional iterations, a lowest latency value at which a match is known to occur at least some of the time may be determined. In general, latency values for the method discussed herein may be divided into three different ranges. A first range includes latency values in which any read attempt results in a match always occurs. A second range includes latency values that are less than those of the first range and in which repeated iterations result in some matches and some mismatches. A third range includes latency values which are less than those of the second range and in which only mismatches occur. These ranges may be determined during performance of method 700.

If the repeated attempts result in consistent mismatches, the method may forego further attempts (block 735, no). Thereafter, a register (e.g., CSR 45) may be programmed with a latency value expressed as a number of nclk cycles (block 740) for Slot 0. Subsequently, the method begins Slot 1 training at the minimum number of nclk cycles at which any pass occurred when training for Slot 0.

Slot 1 training may commence with the issuance of a read command from Slot 1 (block 745). Subsequent to the issuance of that command, read data may be received in the queue (block 750). The received data may be de-queued and compared to the data pattern after the specified number of nclk cycles, which is the minimum number at which any pass occurred for Slot 0 in this case (block 755). If the comparison results in a match at this point (block 760, yes), the CSR may be programmed with the latency value for Slot 1 that is the same as that for Slot 0. If the comparison result does not result in a match (block 760, no), a determination is made as to whether additional attempts will follow. If additional attempts are to be followed (block 764, yes), the method returns to block 745 and repeats itself. The method may continue this loop for a number of iterations if no match occurs. After a number of iterations without a subsequent match, the method may discontinue further attempts (block 765, no). In this case however, the value that is programmed into the CSR at block 770 is the latency value of Slot 0 plus one extra nclk cycle. At this point, the training method may be complete. The values programmed for Slot 0 and Slot 1 may be used during an operational mode to determine when read data is to be de-queued during a read operation.

The programmed latency values may be based on the lowest latency value during training at which any match occurred. More particularly, the programmed latency value may be based on a latency value in the second range (which may be the lowest value of that range) as described above. The programmed latency values may be augmented with one or more extra nclk cycles (e.g., a compensation factor) to compensate for environmental variations that may affect the electrical characteristics of the read path. Such variations may include (but are not limited to) voltage and temperature variations, as well as others previously discussed above. Accordingly, method 700 as discussed herein may determine lowest latency values for which a match is possible for each slot, and may then augment each of these values with one or more extra nclk cycles in order to arrive at corresponding programmed latency values that consistently yield valid read data. Such a methodology may reduce the double counting of uncertainties in the read path when setting the programmed latency values.

Figure 8:
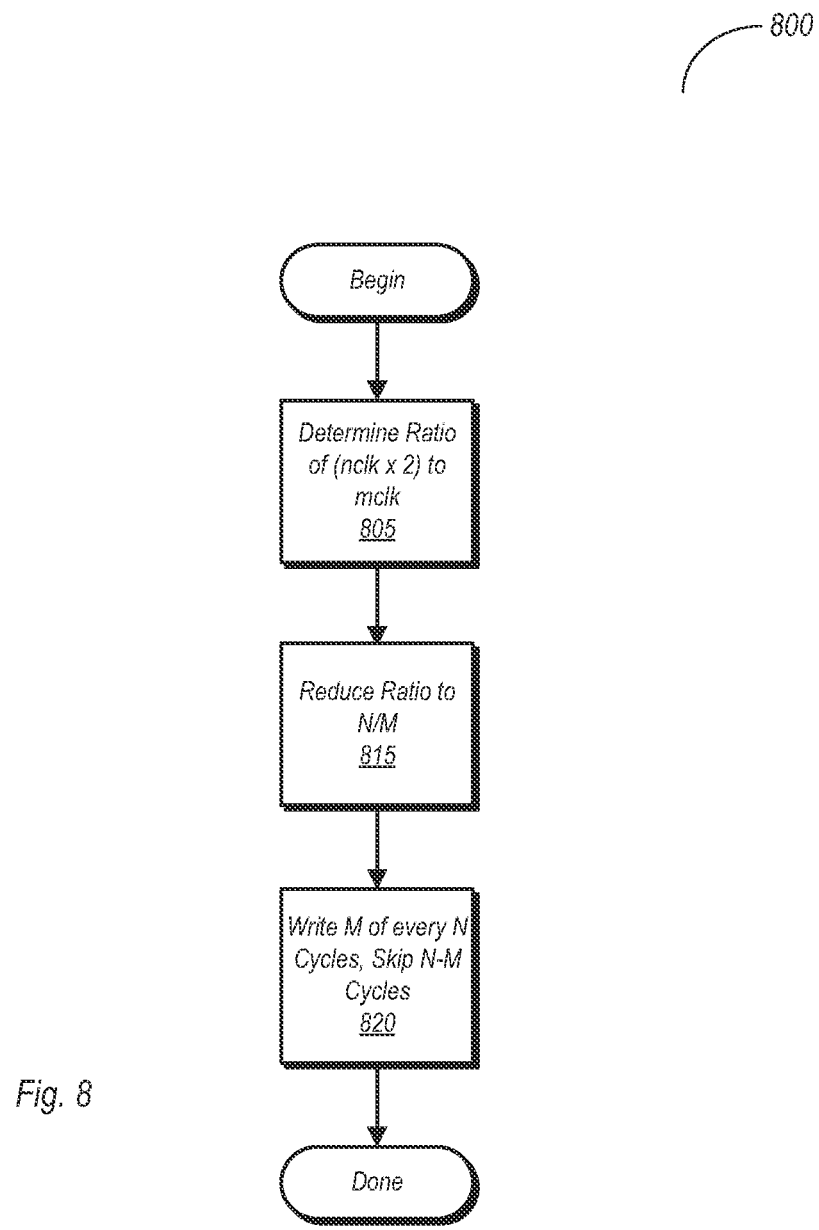
FIG. 8 is a flow diagram for determining a number of skipped writes in a certain period if the rates of reading from and writing to a command FIFO are not bandwidth matched in one embodiment of a memory controller.

Method for Determining Command FIFO Write Skips:

FIG. 8 is flow diagram illustrating one embodiment of a method for determining skipped writes for a command FIFO when the write and read operation are not bandwidth matched. More particularly, method 800 may be used to determine when to periodically throttle a clock signal (e.g., nclk) used to advance a write pointer of the command FIFO when it otherwise advances faster than a read pointer. One embodiment of the method may be carried out by the hardware embodiment of FIG. 6. However, it is noted that other hardware embodiments as well as software embodiments may also carry out method 800.

Method 800 begins with the determining of a bandwidth ratio (block 805). In this particular embodiment, the bandwidth ratio may be determined by multiplying the nclk frequency by two and dividing the product by the mclk frequency. In general, the determination of the bandwidth ratio is a determination of the respective average rates of advance of a write pointer and a read pointer for a FIFO.

The bandwidth ratio may be expressed in terms of values of N and M (related to the nclk and mclk, respectively), wherein N and M are both integers (block 815). Based on this ratio, a write may be performed for M cycles out of every N of the nclk signal (block 820). The remaining N-M write cycles may be skipped in order to prevent the write pointer from overrunning the read pointer. For example, if N=2 and M=1, every other nclk cycle may result in a skipped write. In another example, if N=4 and M=3, one of every four nclk cycles may result in a skipped write, while writes may occur on the other three nclk cycles. If N=M, the read and write pointers are advancing at the same rate, and thus no cycles are skipped.

Figure 9:
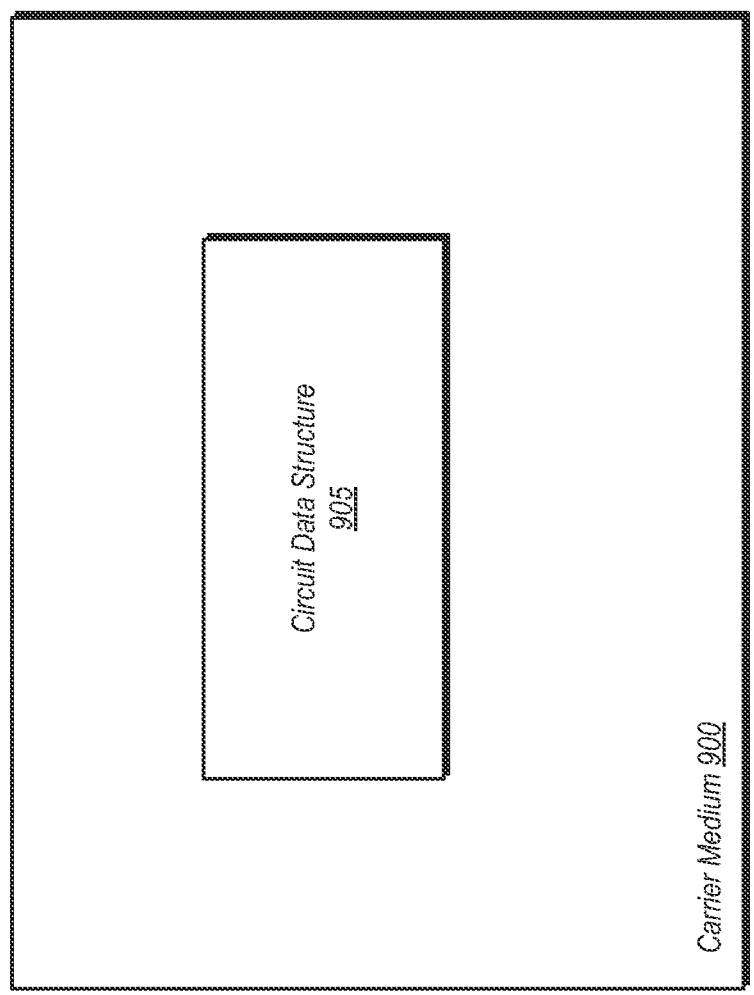
FIG. 9 is a block diagram of one embodiment of a computer readable medium including a data structure describing an embodiment of a memory controller.

Computer Accessible Storage Medium:

Turning next to FIG. 9, a block diagram of a computer accessible storage medium 900 including a database 905 representative of the system 10 is shown. Generally speaking, a computer accessible storage medium 900 may include any non-transitory storage media accessible by a computer during use to provide instructions and/or data to the computer. For example, a computer accessible storage medium 900 may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, the data 905 representative of the system 10 and/or portions thereof carried on the computer accessible storage medium 900 may be a database or other data structure which can be read by a program and used, directly or indirectly, to fabricate the hardware comprising the system 10.

For example, the database 905 may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 10. The netlist may then be placed and routed to produce a data set describing geometric shapes to be applied to masks. The masks may then be used in various semiconductor fabrication steps to produce a semiconductor circuit or circuits corresponding to the system 10. Alternatively, the database 905 on the computer accessible storage medium 900 may be the netlist (with or without the synthesis library) or the data set, as desired, or Graphic Data System (GDS) II data.

While the computer accessible storage medium 900 carries a representation of the system 10, other embodiments may carry a representation of any portion of the system 10, as desired, including IC 2, any set of agents (e.g., processing cores 11, I/O interface 13, north bridge 12, etc.) or portions of agents.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

What is claimed is:

1. A memory controller comprising:

a command FIFO (first-in first-out memory) having a plurality of storage locations, wherein the command FIFO is configured to receive, from a scheduler of the memory controller, an identical command into two consecutive storage locations, wherein the command FIFO is further configured to convey commands to a memory, wherein the command FIFO is configured to store commands into two consecutive locations of the FIFO each cycle of the first clock signal and further configured to convey one command to the memory each cycle of a second clock signal, wherein a frequency of the first clock signal is at least one half of a frequency of the second clock signal, wherein writes to the command FIFO are conducted based on a write pointer, and wherein reads of the command FIFO are conducted based on a read pointer, wherein the write pointer is configured to advance at a first rate corresponding to the frequency of the first clock signal, wherein the read pointer is configured to advance at a rate corresponding to the frequency of the second clock signal;

a skip unit configured to cause writes to the command FIFO to be periodically inhibited based on a deterministic pattern generated from a ratio of the frequency of the first clock signal to the second clock signal;

a data queue coupled to receive data read from the memory; and a register configured to provide a value indicative of a number of cycles of a first clock signal after which data is valid subsequent to a command being written into the command FIFO;

wherein, the memory controller is configured to, during a startup routine:

convey a read command to the memory;

compare data received by the data queue to a known data pattern after a specified number of cycles of the first clock signal have elapsed subsequent to writing the read command to the command FIFO, the specified number indicated by a first value stored in the register;

decrement the first value and repeat conveying and comparing if the data received matches the data pattern;

attempt one or more additional reads, without decrementing the first value, if the data received does not match the data pattern; and program a second value into the register, the second value being a memory read latency value expressed as a number of cycles of the first clock signal, wherein the second value is based on a lowest number of cycles of the first clock signal at which the data received matches the data pattern.

2. The memory controller as recited in claim 1, wherein the skip unit is configured to determine when a skip delay is at a minimum, and wherein the skip unit is configured to provide an indication when the skip delay is at the minimum.

3. The memory controller as recited in claim 2, wherein, during a training mode conducted during the startup routine, the memory controller is configured to delay insertion of commands into the command FIFO until receiving the indication from the skip unit.

4. The memory controller as recited in claim 1, wherein the read pointer is configured to advance at a rate corresponding to a frequency of a third clock signal, wherein the frequency of the third clock signal is twice that of the second clock signal, and wherein the write pointer is configured to write each command to two consecutive locations in the command FIFO.

5. The memory controller as recited in claim 1, wherein, during a training mode, the memory controller is configured to:

setting a first mode such that all commands are written to a first command slot;

determine a first read latency for a read based on a number of cycles of the first clock signal subsequent to the command being written to the first command slot and responsive thereto, to write the first read latency to the register;

setting a second mode such that all commands are written to a second command slot;

determine a second read latency for a read based on a number of cycles of the first clock signal subsequent to the command being written to the second command slot and responsive thereto, write the second read latency to the register; and wherein during a normal mode of operation, a de-queue unit of the memory controller is configured to determine whether data received in a read data queue is based on the command being issued from the first command slot or the second command slot; and wherein the de-queue unit is further configured to select one of the first and second read latencies based on determining which command slot the command was issued from.

6. The memory controller as recited in claim 1, wherein the register is further configured to store a value corresponding to a desired setup time with respect to commands written into the command FIFO, and wherein, during the startup routine, a phase adjustment unit of the memory controller is configured to cause an adjustment to a phase of the second clock signal with respect to a third clock signal upon which the second clock signal is based, wherein the desired setup time is obtained responsive to the adjustment of the phase of the second clock signal.

7. The memory controller as recited in claim 6, wherein the phase adjustment unit is configured to adjust the phase such that the desired setup time is equal to one of the following:
one cycle of the second clock signal;
one half cycle of the second clock signal.

8. A method comprising:
a memory controller writing a data pattern to a block of memory having a highest read latency relative to other blocks of memory;
receiving data from the memory responsive to providing a read command to the memory;
comparing the received data to the data pattern, wherein said comparing is performed after a specified number of cycles of a first clock signal have elapsed subsequent to the read command being written into two consecutive storage locations of a command first-in first-out memory (FIFO) that is coupled to convey commands to the memory;
decrementing the specified number of cycles and repeating said providing, said receiving, and said comparing if the received data matches the data pattern; and
writing a memory read latency value to a register, wherein the memory read latency value is expressed as a number of cycles of the first clock signal, and wherein the memory read latency value is based on a lowest specified number of cycles of the first clock at which a match occurred between the received data and the data pattern;
wherein the method further comprises:
wherein the method further comprises:
writing commands to the command FIFO based on a write pointer and reading commands from the FIFO based on a read pointer, and further comprising advancing the write pointer at a rate corresponding to the frequency of the first clock signal and advancing the read pointer at a rate corresponding to a second clock signal;
advancing the write pointer at the rate of the first clock signal and advancing the read pointer at the rate of a third clock signal, and wherein writing commands to the command FIFO comprises writing a same command to two consecutive locations, and wherein reading a command comprises reading the same command from two consecutive locations, wherein the second clock signal is produced by dividing the third clock signal by b 2.

9. The method as recited in claim 8, wherein the memory read latency value is the sum of the lowest specified number of clock cycles at which the received data matched the data pattern and a compensation factor.

10. The method as recited in claim 8, wherein the memory controller is configured to wait for a number of cycles of the first clock signal as indicated by the memory read latency value before reading data from a data queue coupled to receive the data for memory reads performed subsequent to said writing the memory read latency value.

11. The method as recited in claim 8, further comprising periodically inhibiting writing of commands to the command FIFO if a bandwidth ratio is greater than 1, wherein a numerator of the bandwidth ratio is twice the frequency of the first clock signal and a denominator of the bandwidth ratio is the frequency of the second clock signal.

12. The method as recited in claim 8, further comprising:
reading a desired setup time value from the register, wherein the desired setup time value is one of the following: one half cycle of the second clock signal or one cycle of the second clock signal; and
wherein the method further includes:
adjusting the desired setup time by changing a phase of the second clock signal by one period of a third clock signal, wherein the second clock signal is produced based on the third clock signal.

13. The method as recited in claim 8, further comprising a skip unit determining when a skip delay is at a minimum value and providing an indication responsive to determining when the skip delay is at the minimum value; and
writing a command to the command FIFO responsive to the skip unit providing the indication.

14. The method as recited in claim 8, further comprising:
forcing all commands to be written into a first command slot during operation in a first mode;
determining a first read latency for a read based on a number of cycles of the first clock signal subsequent to the command being issued from the first command slot and writing the first read latency to the register;
forcing all commands to be written into a second command slot during operation in a second mode;
determining a second read latency for a read based on a number of cycles of the first clock signal subsequent to the command being issued from the second command slot and writing the second read latency to the register;
during a normal mode of operation, a de-queue unit determining whether data received in a read data queue is based on the command being issued from the first command slot or the second command slot; and
selecting one of the first and second read latencies based on said determining.

15. An integrated circuit comprising:
one or more functional units; and
a memory controller configured to control access to a memory by the one or more functional units, wherein the memory controller is configured to operate synchronous with a first clock signal, wherein during a system startup routine the memory controller is configured to:
write a data pattern to a block of the memory that is physically farther from the memory controller than any other block of memory;
issue a read command to the memory to read the block of memory;
receive data read from the block of memory in a data queue of the memory controller;
compare the data received from the block of memory to the data pattern, wherein comparing is performed at a specified number of cycles of the first clock signal subsequent to writing the read command to two consecutive storage locations of a command first-in first out memory (FIFO) coupled to convey commands to the memory, wherein the command FIFO is configured to store commands into two consecutive locations of the FIFO each cycle of the first clock signal and further configured to convey one command to the memory each cycle of a second clock signal, wherein a frequency of the first clock signal is at least one half of a frequency of the second clock signal, wherein writes to the command FIFO are conducted based on a write pointer, and wherein reads of the command FIFO are conducted based on a read pointer, wherein the write pointer is configured to advance at a first rate corresponding to the frequency of the first clock signal, wherein the read pointer is configured to advance at a rate corresponding to the frequency of the second clock signal;

decrement the specified number of cycles and repeat issuing, receiving, and comparing if the data received from the block of memory matches the data pattern;

record a value of a number of cycles of the first clock signal in a register responsive to determining a number of clock cycles wherein the data received from the block of memory does not match the data pattern for any attempted read of the memory, wherein the value is based on a minimum number of cycles of the first clock signal at which the data received from the block of memory matched the data pattern.

16. The integrated circuit as recited in claim 15, wherein the memory controller further comprises a skip generator configured to inhibit writes to the command FIFO based on a deterministic pattern generated from a ratio of the first clock signal to the second clock signal.

17. The integrated circuit as recited in claim 16, wherein the register is further configured to store a value corresponding to a desired setup time with respect to commands written into the command FIFO, and wherein, during the startup routine, a phase adjustment unit of the memory controller is configured to cause an adjustment to a phase of the second clock signal with respect to a third clock signal upon which the second clock signal is based, wherein the desired setup time is obtained responsive to the adjustment of the phase of the second clock signal.

18. A non-transitory computer readable medium comprising a data structure which is operated upon by a program executable on a computer system, the program operating on the data structure to perform a portion of a process to fabricate an integrated circuit including circuitry described by the data structure, the circuitry described in the data structure including:

a memory controller having a command FIFO (first-in first-out memory) including a plurality of storage locations, wherein the command FIFO is configured to receive an identical command into two consecutive storage locations, wherein the command FIFO is further configured to convey commands to a memory coupled to the memory controller, wherein the memory controller further includes a data queue coupled to receive data read from the memory, and a register configured to provide a value indicative of a number of cycles of a first clock signal after which data is valid subsequent to a read command being written into the command FIFO, wherein the command FIFO is configured to store commands into two consecutive locations of the FIFO each cycle of the first clock signal and further configured to convey one command to the memory each cycle of a second clock signal, wherein a frequency of the first clock signal is at least one half of a frequency of the second clock signal, wherein writes to the command FIFO are conducted based on a write pointer, and wherein reads of the command FIFO are conducted based on a read pointer, wherein the write pointer is configured to advance at a first rate corresponding to the frequency of the first clock signal, wherein the read pointer is configured to advance at a rate corresponding to the frequency of the second clock signal;

wherein, the memory controller described in the data structure is configured to perform a latency training routine comprising:

conveying a read command to the memory;

comparing data received by the data queue to a known data pattern after a specified number of cycles of the first clock signal have elapsed, the specified number indicated by a first value stored in the register;

decrementing the first value and repeat conveying and comparing if the data received matches the data pattern; and programming a second value into the register responsive to determining a number of clock cycles wherein the received data does not match the data pattern for any attempted read of the memory, the second value being a memory read latency value expressed as a minimum number of cycles of the first clock signal at which the data received matched the data pattern.

19. The computer readable medium as recited in claim 18, wherein the command FIFO described in the data structure is configured to store commands into two consecutive locations of the FIFO each cycle of the first clock signal and further configured to convey one command to the memory each cycle of a second clock signal, wherein a frequency of the first clock signal is at least one half a frequency of the second clock signal, and wherein the memory controller described in the data structure further comprises a skip generator configured to inhibit writes to the command FIFO based on a deterministic pattern generated from a ratio of the frequency of the first clock signal to the second clock signal.

20. The computer readable medium as recited in claim 18, wherein the register described in the data structure is further configured to store a value corresponding to a desired setup time with respect to commands written into the command FIFO, and wherein, during the startup routine, a phase adjustment unit of the memory controller is configured to cause an adjustment to a phase of the second clock signal relative to a third clock signal upon which the second clock signal is based, wherein the desired setup time is obtained responsive to the adjustment of the phase of the second clock signal.

21. The computer readable medium as recited in claim 18, wherein the data structure comprises one or more of the following types of data:

HDL (high-level design language) data;
RTL (register transfer level) data;
Graphic Data System (GDS) II data.

* * * * *